United States Patent [19]

Vranish

[11] Patent Number: 5,539,292

[45] Date of Patent: Jul. 23, 1996

[54] CAPACIFLECTOR-GUIDED MECHANISMS

[75] Inventor: John M. Vranish, Crofton, Md.

[73] Assignee: The United States of America as represented by the Administrator of the National Aeronautics and Space Administration, Washington, D.C.

[21] Appl. No.: 346,593

[22] Filed: Nov. 28, 1994

[51] Int. Cl.$^6$ ............................................. H02P 7/00
[52] U.S. Cl. ........................... 318/568.21; 318/568.16; 324/686; 901/35
[58] Field of Search ........................... 318/568.1, 562.11, 318/568.16, 568.21, 570; 340/870.37, 562; 901/23, 31, 35, 36, 38, 46; 324/686, 687, 690, 600, 601; 361/179, 101; 364/424.37, 482

[56] References Cited

U.S. PATENT DOCUMENTS

| | | | |
|---|---|---|---|
| 4,782,274 | 11/1988 | Teegarden et al. | 318/568 |
| 4,908,557 | 3/1990 | Sudare et al. | 318/587 |
| 5,166,679 | 11/1992 | Vranish et al. | 340/870.37 |
| 5,214,388 | 5/1993 | Vranish et al. | 340/870.37 |
| 5,280,225 | 1/1994 | Pine et al. | 318/575 |
| 5,293,107 | 3/1994 | Akeel | 318/568.11 |
| 5,442,347 | 8/1995 | Vranish | 340/870.37 |

*Primary Examiner*—Jonathan Wysocki
*Attorney, Agent, or Firm*—Dennis Marchant

[57] ABSTRACT

A plurality of capaciflector proximity sensors, one or more of which may be overlaid on each other, and at least one shield are mounted on a device guided by a robot so as to "see" a designated surface, hole or raised portion of an object, for example, in three dimensions. Individual current-measuring voltage follower circuits interface the sensors and shield to a common AC signal source. As the device approaches the object, the sensors respond by a change in the currents therethrough. The currents are detected by the respective current-measuring voltage follower circuits with the outputs thereof being fed to a robot controller. The device is caused to move under robot control in a predetermined pattern over the object while directly referencing each other without any offsets, whereupon by a process of minimization of the sensed currents, the device is dithered or "wiggled" into position for a soft touchdown or contact without any prior contact with the object.

16 Claims, 10 Drawing Sheets

FIG.19

CAPACIFLECTOR-GUIDED MECHANISMS

ORIGIN OF THE INVENTION

The invention described herein was made by an employee of the United States Government, and may be manufactured and used by or for the Government for governmental purposes without the payment of any royalties thereon or therefor.

CROSS REFERENCE TO RELATED APPLICATIONS

This invention is related to an invention shown and described in:

(1) U.S. Ser. No. 08/008,426, entitled, "Double Driven Shield Capacitive Type Proximity Sensor", filed in the name of John M. Vranish, the present inventor, on Jan. 25, 1993, now U.S. Pat. No. 5,442,347, issuing on Aug. 15, 1995;

(2) U.S. Ser. No. 08/187,344 (attorney Docket No. GSC13,563-1), entitled, "Current-Measuring Op-Amp Devices", filed in the name of John M. Vranish, the present inventor, on Jan. 31, 1994 ; and (3) U.S. Ser. No. 08/394,108 (attorney Docket No. GSC13,618-1), entitled, "Frequency Scanning Capaciflector", filed in the name of Charles E. Campbell, Jr. on Feb. 15, 1995.

The above-noted related applications are assigned to the assignee of the present invention. Moreover, the teachings of these related applications are herein meant to be incorporated by reference.

BACKGROUND OF THE INVENTION

1. Field of the Invention

This invention relates to capacitive type proximity sensors, and more particularly to robotically positioned devices including capaciflector proximity sensors.

2. Description of the Prior Art

Capaciflector technology involves a capacitive proximity sensing element backed by a reflector driven at the same voltage as and in phase with the sensing element. The reflector is used to reflect electrical field lines from the sensor away from a ground plane and towards an object being sensed. Such a device is shown and described in detail in U.S. Pat. No. 5,166,679, entitled, "Driven Shielding Capacitive Proximity Sensor" granted to John M. Vranish et al on Nov. 24, 1992.

A phase discriminating capacitive type sensor array system which includes multiple capaciflector sensor elements which are maintained at a phase and amplitude based on a frequency reference provided by a single frequency stabilize oscillator is also known and is shown and described in U.S. Pat. No. 5,214,388, entitled, "Phase Discriminating Capacitive Array Sensor System", granted to John M. Vranish et al on May 25, 1993.

In U.S. Pat. No. 5,373,245 granted to John M. Vranish on Dec. 13, 1994, entitled, "Capaciflector Camera", there is disclosed a sensor system wherein a capaciflector array consisting of multiple rows and columns of capaciflector sensor elements enables a device to generate close-in images of the object being sensed as it is approached, for example, in a berthing or docking maneuver as well as providing an invaluable aid in obstacle avoidance in navigation.

An electronic circuit which has been found to be particularly useful in capaciflector apparatus, is a circuit element known as a current-measuring voltage follower circuit. This circuit enables current changes in the sensor and shielding elements of the capaciflector to be accurately sensed without cross talk between neighboring elements and/or their electrical leads. Such circuitry is further shown and described in detail in above referenced related application Ser. No. 08/187,344, entitled "Current-Measuring Op-Amp Devices".

Heretofore robotic berthing and docking operations in free space lacked any substantial precision. This has led to unexpected and imprecisely predicted minor collisions during the berthing/docking procedures which are not helpful to the precision scientific instruments on board. Safety has also been compromised. The most dangerous aspect of conventional systems is that with the extensive use of passive compliances and relatively large mechanical error corrections made by alignment cones, mechanical energy is stored and as a consequence the system can easily jam or lurch upon removal. With this undesirable possibility comes damage and mission failure. Passive compliances also lead to spongy, imprecise handling characteristics when the payload is being transported from one position to another in space.

Also this approach has classically been based on camera views backed up by a computer world model. With such techniques, there are always those safety issues caused by limitations of the camera view and discrepancies between the world model and hardware. Additionally, sensory field-of-view obstructions and lighting distortions and limitations can seriously handicap robotic operations. For example, present state-of-the-art apparatus cannot see very near the point of contact. Thus, if a cone is not exactly in the correct place or if a fastening hook is ajar, it would not be possible to detect this. All that would be known is that the operation has not been successful. In the subject invention, however, the apparatus in effect "views" a berthing hole, for example, from the viewpoint of the pin being inserted and as a result there are no obstructions.

With the large sizes of alignment cones and tool pins and passive compliance required, the number of applications are necessarily limited. For example, at present an entire end effector must be exchanged if the end-point of the robot tool is changed. With the subject invention, only the tool bits need be changed.

SUMMARY

Accordingly, it is an object of the present invention to provide an improved capacitance type proximity sensing system whereby a piece of apparatus can be guided to a final destination with great precision.

It is another object of the invention to provide an improvement in capaciflector type proximity sensors whereby a robot can guide one piece of apparatus into contact with another without misalignments and undesired collisions.

It is yet another object of the invention to provide a robotically controlled capaciflector type sensing system for achieving precision pre-contact final alignment and soft touchdown on or in an opposing surface.

It is a further object of the invention to provide a capaciflector sensor system which can provide close-in 3-D imaging of approaching contact areas up to the moment of contact.

It is still a further object of the invention to provide an improved robotics system including a three dimensional capaciflector array for safely positioning devices in a zero gravity as well as in a one "g" environment.

Briefly, the foregoing and other objects are achieved by a plurality of capaciflector proximity sensors, one or more of which may be overlaid on each other, and at least one shield mounted on a device guided by a robot so as to "see" a designated surface, hole or a raised portion of an object. Individual current-measuring voltage follower circuits interface the sensors and shield to a common AC signal source. As the device approaches the object, the sensors respond by a change in the currents therethrough. The currents are detected by the respective current-measuring voltage follower circuits with the outputs thereof being fed to a robot controller where the contact between mating members of the device and object will occur somewhere on the sensing surfaces. Because electrical charge slides along the surface of a conductor with ease and because it induces an equal but opposite charge on the other mating member these charges will collect at the point which are nearest each other and therefore the output of the sensors will indicate a minimum separation distance between the device and object. The result is that the robot will not only be warned of impending contact with the object but also will have a measure of how immediate contact will be. The device is caused to move back and forth under robot control in a predetermined pattern over the object while directly referencing each other without any offsets whereupon by a process of minimization of the sensed currents, the device is dithered or "wiggled" into position for a soft touchdown or contact without any prior contact with the object.

BRIEF DESCRIPTION OF THE DRAWINGS

The following detailed description of the invention will be more readily understood when considered together with the accompanying drawings wherein.

DETAILED DESCRIPTION OF THE INVENTION

Before considering the structural details of the present invention, it should be noted that this invention is directed primarily but not limited to robotics used for assembly in zero "g" environments. In zero "g" or outer space, parts used in construction of space stations and the like are free to float away so robotic assembly involves either berthing or docking. Berthing is the term commonly used when a robot or machine is anchored to a common fixture in a closed kinematic chain with the payload that it is trying to remove from or attach to. Docking, on the other hand, is the term used when the robot or machine is trying to remove or attach a pay load to a fixture which is free floating with respect to the robot in an open kinematic change. Though the two situations use essentially the same technology, the focus of this invention is primarily directed to berthing.

Traditionally, berthing has been accomplished using a combination of passive and/or active compliance, large mechanical alignment pins and cones, cameras, force/torque sensors and computer/teleoperator shared control. Experience has shown that the procedures used for correcting alignment errors in zero "g" environments after contact by a combination of mechanical guides and passive compliance, has serious consequences which include parts jamming, undesired impact forces, excess size and mass, marginal safety and sophisticated computer requirements.

The technique which will now be described involves the use of devices which are positioned by a robot and which include capaciflector proximity sensors mounted thereon. Capaciflector sensors are shown and described in their simplest form in the above-referenced U.S. Pat. No. 5,166, 679, entitled, "Driven Shielding Capacitive Proximity Sensor".

Considering now the details of the invention and referring to the drawings wherein like reference numerals refer to like parts throughout, a proximity sensor such as taught in U.S. Pat. No. 5,166,679 is shown diagrammatically in FIG. 1A where reference numeral 10 denotes a sensor element which is located between a ground plane 12 and an object 14 to be sensed. The sensor element 10 normally comprises a thin sheet of conducting material driven by an electronic circuit such as shown in FIG. 1B and forms one electrode of a capacitor, the second electrode being the object 14 being sensed and other nearby objects. Another thin sheet of conducting material considerably larger in size than the sheet forming the sensor element 10 comprises a reflective shield member 16 which is inserted between the sensor element 10 and the ground plane 12, thus shielding the sensor element 10 from the ground plane 12 such that the capacitance between it and the ground is substantially reduced, thus reducing background noise and improving signal to noise ratio. Both the sensor element 10 and the shield 16 are driven through a respective voltage follower circuit 18 (FIG. 1B) coupled to an oscillator circuit 20. The output signal $V_0$ at circuit node 30 (FIG. 1B) increases in direct proportion to the increase in capacitance and the inverse of the range between the sensor element 10 and the object 14. Such apparatus provides a substantial improvement in range and sensitivity.

The current-measuring voltage follower as shown by reference numeral 18 in FIG. 1B is set forth in the above cross referenced application U.S. Ser. No. 08/187,344 and includes an operational amplifier (Op-Amp) 22. The Op-Amp 22 is, in effect, a microminiature precision high gain servo system where the voltage of the oscillator 20 applied to the + terminal of Op-Amp 24 is servoed back to its − terminal via a feedback connection 24 from circuit node 26 back to the −terminal. Although both the + and − input terminals of the Op-Amp 22 are of high impedance, it is also a current source with a low impedance output. Thus the current flowing through the sensing element 10 can be sensed by means of the voltage $V_0$ generated across resistor 28 and appearing at circuit node 30.

Figure 1A:
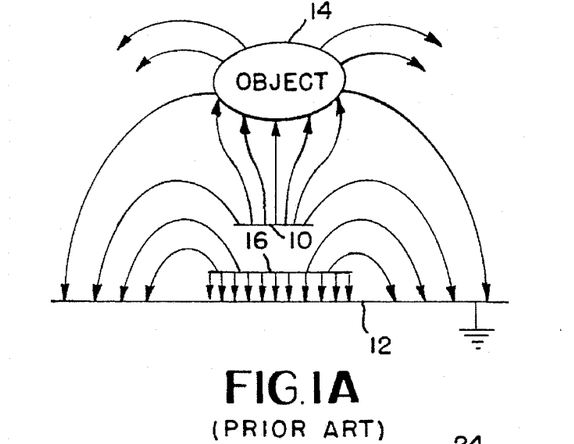
FIG. 1A is a diagram illustrative of the principle of operation of a known prior art capaciflector type proximity sensing device.
Figure 1B:
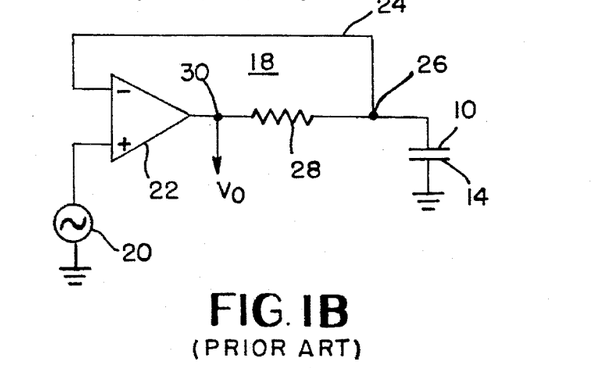
FIG. 1B is a schematic diagram of a current-sensing voltage follower circuit typically used in connection with a capaciflector sensor such as shown in FIG. 1A.

A sensor configuration including the elements of FIGS. 1A and 1B provides a monotonically increasing capacitance value as range decreases and accordingly an increasing current signal $V_o$ is generated across resistor 28 as the capaciflector approaches the object 14. This capacitance (current) variation is further shown in FIG. 2 where the curve 32, for example, is illustrative of the response curve for a relatively large sized sensor element 10, while the curve 34 is illustrative of the characteristic of a relatively small sized sensor element 10.

Such a sensor system provides a simple, rugged, flexible configuration that can be affixed to an outside surface of any device which, for example, is driven by a robot and has the ability to virtually "see" any object it encounters as long as it either is a conductor or has dielectric properties.

The apparatus to be described with respect to this invention depends on information from one or more capaciflector type proximity sensors 10 co-located at selected points, including contact or fastening points between a robotically controlled device and a target object. In this regard, multiple sensors are mounted in close proximity to and even overlaid on each other on a non-interference basis.

Figure 3:
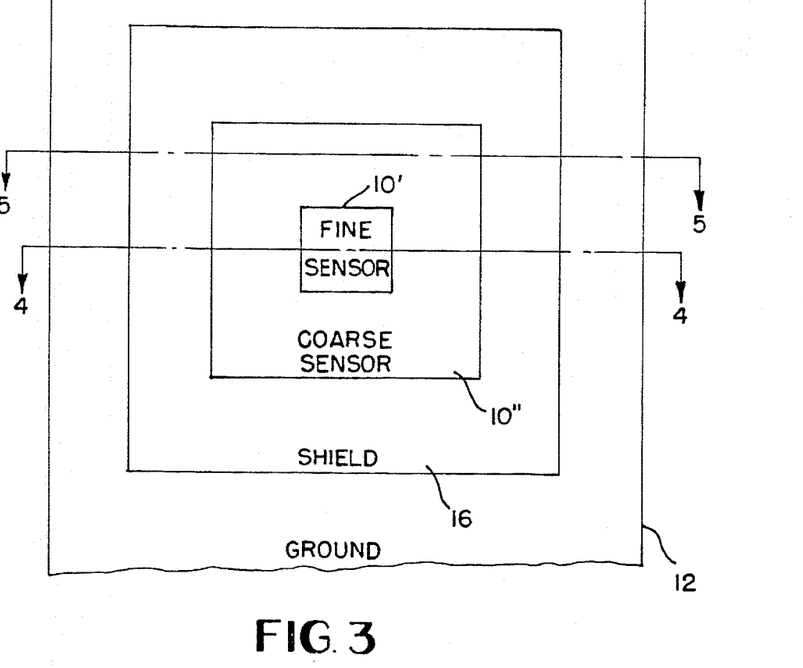
FIG. 3 is a partial planar view of an overlaid capaciflector sensor configuration which can be used by the subject invention.

While the capaciflector devices shown in U.S. Pat. No. 5,166,679 and No. 5,373,245, respectively, disclose a basic type capaciflector sensor and a rectilinear array of sensors defining a camera type structure, in FIG. 3 there is shown an overlaid type capaciflector sensor structure wherein a relatively smaller sized fine sensor element 10' overlays a relatively larger sized coarse sensor element 10", with both sensor elements being centrally aligned over a still larger shield member 16. Further as shown in FIG. 3, the fine sensor element 10', the coarse sensor element 10" and the shield member 16 are affixed to a grounded element 12, which constitutes a ground plane and which may be, for example, a portion of or outside surface of a device 36 (FIG. 6) which is positioned under robotic control.

Figure 2:
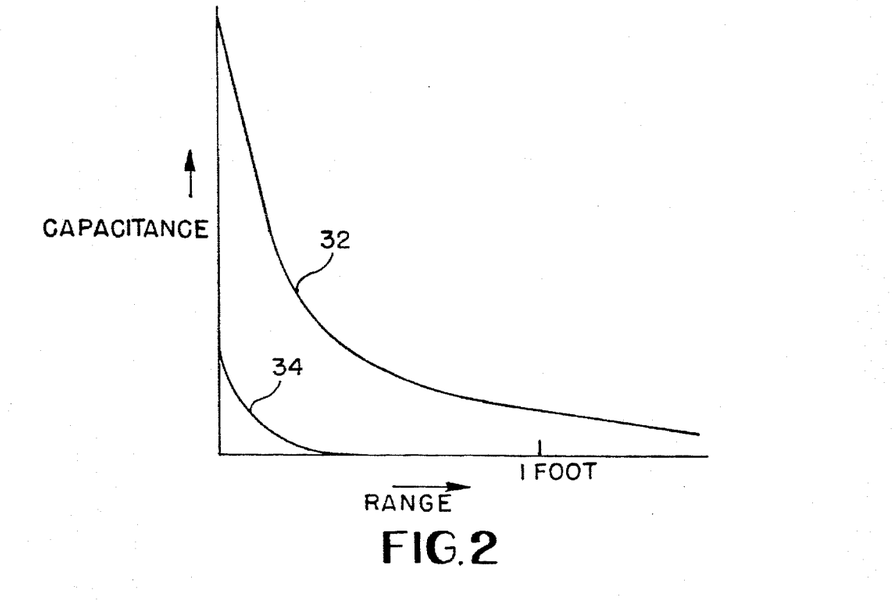
FIG. 2 is a set of curves illustrative of the performance characteristics of a capaciflector such as shown in FIG. 1.

The coarse sensor 10" having a capacitive characteristic as shown by curve 32 in FIG. 2, can be utilized, for example, for large collision avoidance and alignment purposes, whereas the fine sensor element 10', having a characteristic curve as shown in FIG. 2 by reference numeral 34, can be utilized, for example, at the tip of a pin or screw tip for mating with a designated hole or other small aperture.

Figure 4:
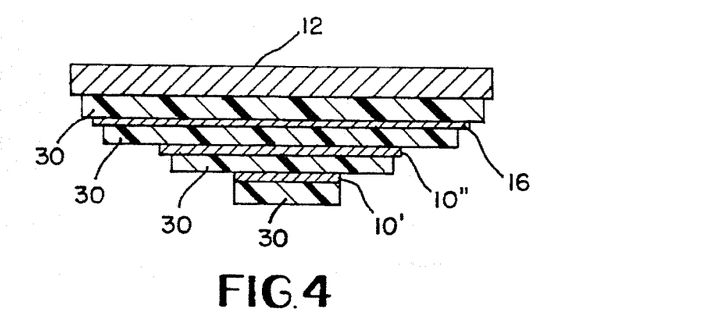
FIG. 4 is a cross-sectional view of the capaciflector configuration shown in FIG. 3 taken along the lines 4—4 thereof.
Figure 5:
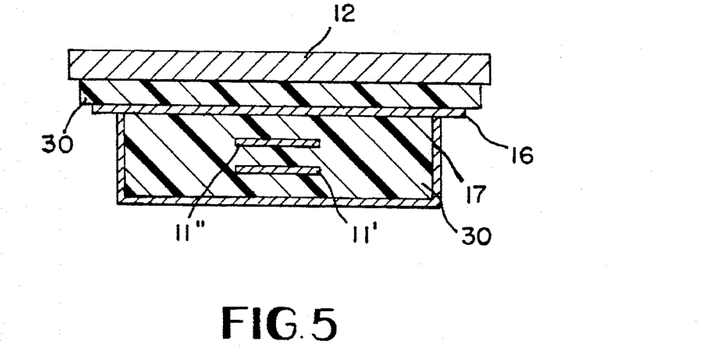
FIG. 5 is a cross-sectional view of the capaciflector configuration shown in FIG. 3 taken along the lines 5—5 thereof.

As shown in FIGS. 4 and 5, the sensors 10' and 10", the shield 16 and the ground member 12 are mutually insulated from one another by layers of insulation 30. As further shown in FIG. 5, the two sensors 10' and 10" include flat metallic lead segments 11' and 11" which extend upwardly from the structure as shown in FIG. 3, while being insulated from one another by the layer of insulation 30, while being surrounded by a shield 17 which forms a portion of the shield 16. It should be noted that the number of sensors is not limited to two, but can be as many as desired depending upon the particular application and the sensitivity desired.

Figure 6:
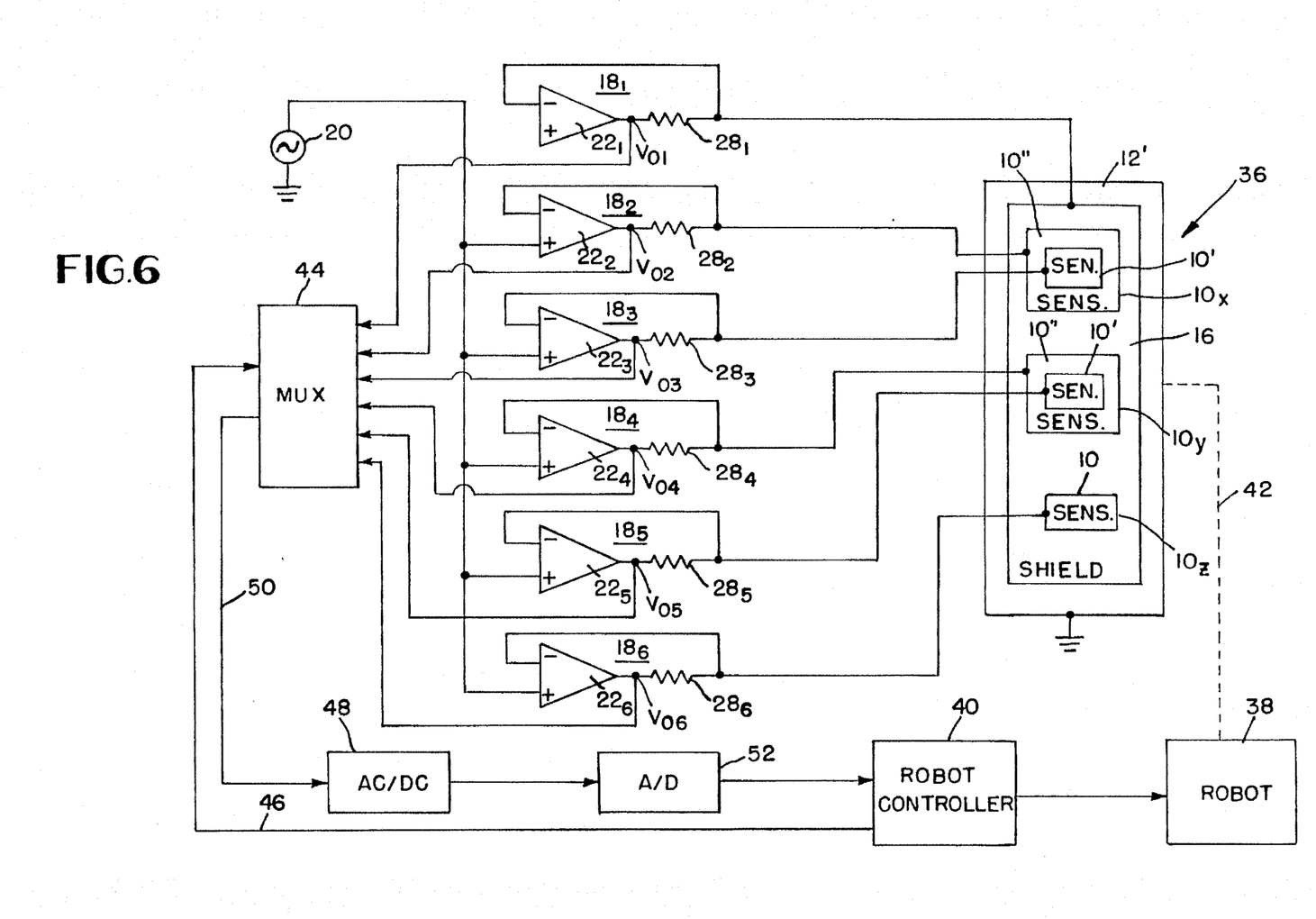
FIG. 6 is an electrical circuit diagram illustrative of the preferred embodiment of the invention.

This now leads to a consideration of FIG. 6, which discloses an electrical schematic whereby a device 36 including a three dimensional (3-D) arrangement of capaciflector sensors is guided by a robot 38 under the control of digital type controller 40. The robot 38 is coupled to the device 36 by a mechanical connection 42, which may be, for example, a robotic arm or some such structure which will provide a three-dimensional movement or translation/rotational movement of the device which is attached thereto.

Referring now to FIG. 6, reference numeral 12' denotes at least one support surface for orthogonal X, Y and Z axis capaciflector sensors $10_x$, $10_y$ and $10_z$ which are positioned over a common shield member 16. The X and Y axis sensors are comprised of overlaid fine and coarse sensor elements 10' and 10" as shown in FIG. 3, while the Z axis sensor comprises a single element 10 such as shown in FIG. 1A.

The shield member 16 and the X, Y and Z axis sensors $10_x$, $10_y$ and $10_z$ are commonly coupled to an AC signal source 20, e.g. an oscillator, through six current-measuring voltage follower circuits $18_1$, $18_2$ ... $18_6$ of the type shown in FIG. 1B. Six respective output voltages $V_{01}$, $V_{02}$ ... $V_{06}$ generated across the current-measuring sensor resistors $28_1$, $28_2$ ... $28_6$ and appearing at the output of the Op-Amps $22_1$, $22_2$ ... $22_6$ are all fed to a multiplexer (MUX) circuit 44 which is controlled by the robot controller 40 via a connection 46 therebetween.

The multiplexed outputs of the current-measuring voltage follower circuits $18_1$, $18_2$ ... $18_6$ are fed from the multiplexer 44 to an AC to DC converter 48 by way of a circuit lead 50. The output of the converter 48 is fed to an analog to digital converter 52, the output of which comprises a digital signal coupled to the robot controller 40. The robot controller 40 is programmed to drive the robot 38 such that the device 36 is moved to the location where the destination object is located, but then stops, for example, approximately 1.0 ft. away from the object. At this point, the robot controller 40 implements an algorithm whereby the device is moved in a predetermined pattern, e.g. a rectangular scan pattern, and measures the response of the sensors on all sides of the target. The robot controller 40 "looks" for a relative minimum between the sensor outputs, each time coming closer and closer to the final destination. The rate of change or derivative of the sensor performance curve is detected so that "virtual forces" are in effect generated which produces a close in alignment followed by a final alignment and soft touch down without any prior contact with the destination object.

Figure 7:
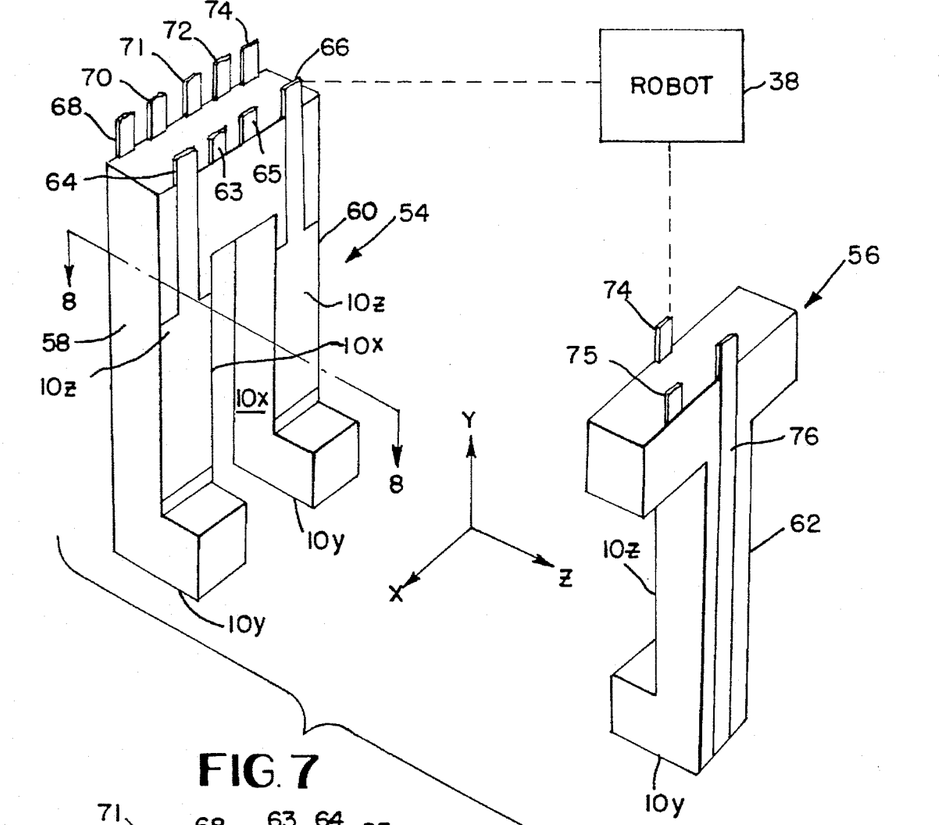
FIG. 7 is a perspective view of a pair of gripper members used for grasping an object and including a three-dimensional array of capaciflector sensors mounted on the outer surface thereof.

A first example of this type of operation is shown in FIG. 7 where a gripper assembly comprised of a bifurcated two digit member 54 and an opposing single digit member 56 include respective right angled finger members 58, 60 and 62. The two fingers 58 and 60 each include three sensors $10_x$, $10_y$ and $10_z$ on inner side, front, and bottom faces respectively, for sensing side or X axis movement, leveling or Y axis movement, and forward or Z axis movement while the finger 62 of the single digit member 56 only includes a Z axis (forward) and Y axis (leveling) sensor $10_z$ and $10_y$ on its respective front and bottom faces. The robot 38 operates to move the two members 54 and 56 mutually forward and backward, side to side, and up and down to effect a pincer type movement when grasping an object, not shown.

Figure 8:
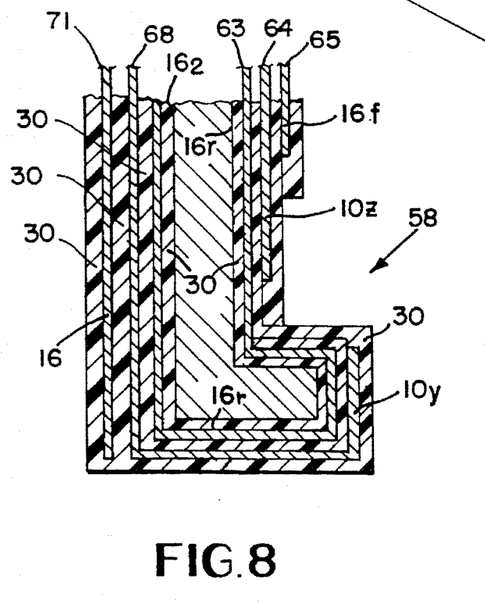
FIG. 8 is a cross-sectional view of one of the bifurcated fingers as shown in FIG. 7 and taken along the lines 8—8 thereof.

In FIG. 8, there is shown a partial cross section of the gripper finger 58 of member 54 and is intended to show the relative positions of alternating layers of shield 16 and sensor metallizations $10_z$ and $10_y$ and insulation 30. Each sensor $10_z$ and $10_y$ and front and rear shield members $16_f$ and $16_r$ attach to respective output metallization layers 63, 64, 65 and 68, 70 . . . 74 which connect to respective current measuring voltage follower circuits, not shown, but which may be, for example, as shown in FIG. 6.

Figure 9:
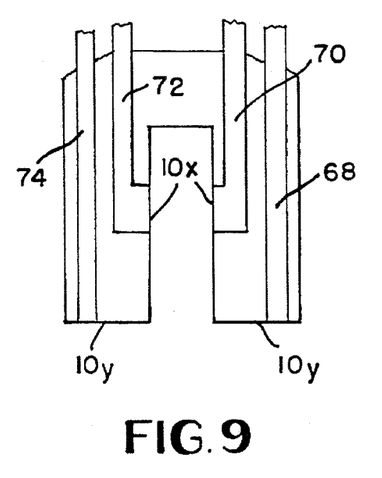
FIG. 9 is a partial rear planar view of the bifurcated finger member shown in FIG. 7.

In FIG. 7 it can be seen that the two z axis sensors $10_z$ include metallization comprising output leads 64 and 66, while the sensors $10_x$ and $10_y$ of finger 58 terminate in leads 68 and 70 formed on the rear surface thereof, while the other finger 60 includes $10_x$ and $10_y$ output metallization leads 72 and 74. For purposes of illustration, three shield leads 63, 65 and 71 are also shown. This arrangement is further shown in FIG. 9. The single digit finger member 62, on the other hand, is shown in FIG. 7 including an output lead metallization 74 on the front face thereof for the sensor $10_z$, while the y axis sensor $10_y$ includes a metallization lead 76 running up the rear surface thereof. A single shield member, not shown, underlying the sensors $10_z$ and $10_y$ terminates in an output lead shown by reference numeral 75.

Accordingly, the configuration shown in FIG. 7 provides a structure wherein each gripper finger 58, 60 and 62 can be a composite structure including a robotic element and a sensor element and where the contact between the mating members will occur somewhere on the sensing surfaces. Also because electrical charge slides along the surface of a conductor with ease and because it induces an equal but opposite charge on the other mating member these charges will collect at the points which are nearest each other and therefore the output of the sensors will indicate a minimum separation distance between the sensing element and the object. The result is that the robot 38 will not only be warned of impending contact with an object but also will have a measure of how immediate contact will be.

Figure 10A:
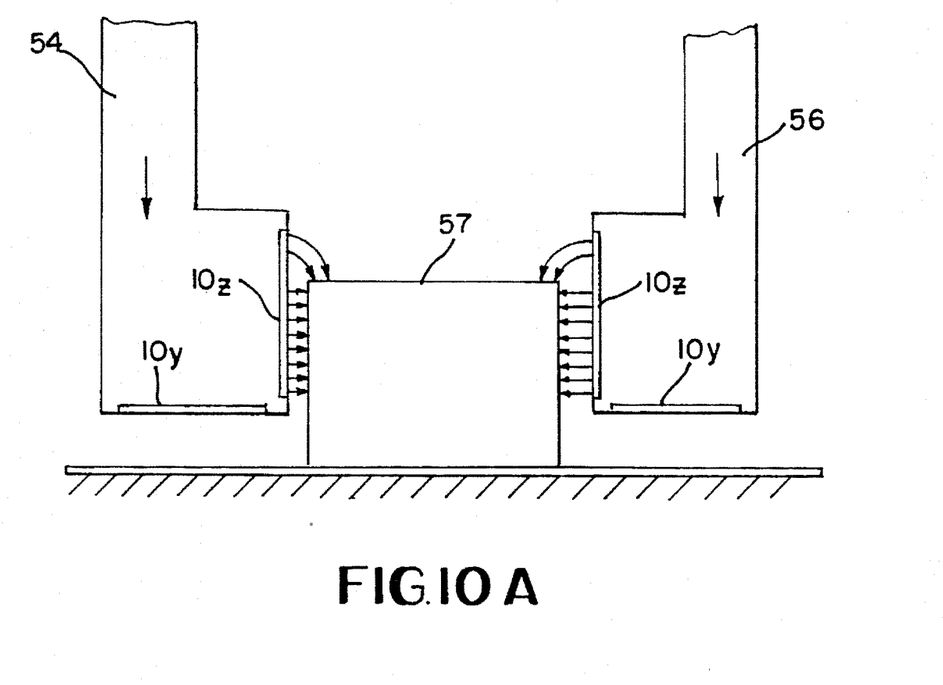
FIGS. 10A and 10B are diagrams illustrative of the operation of the gripper embodiment as shown in FIG. 7 as it positions itself over an object in the process of making contact therewith.
Figure 10B:
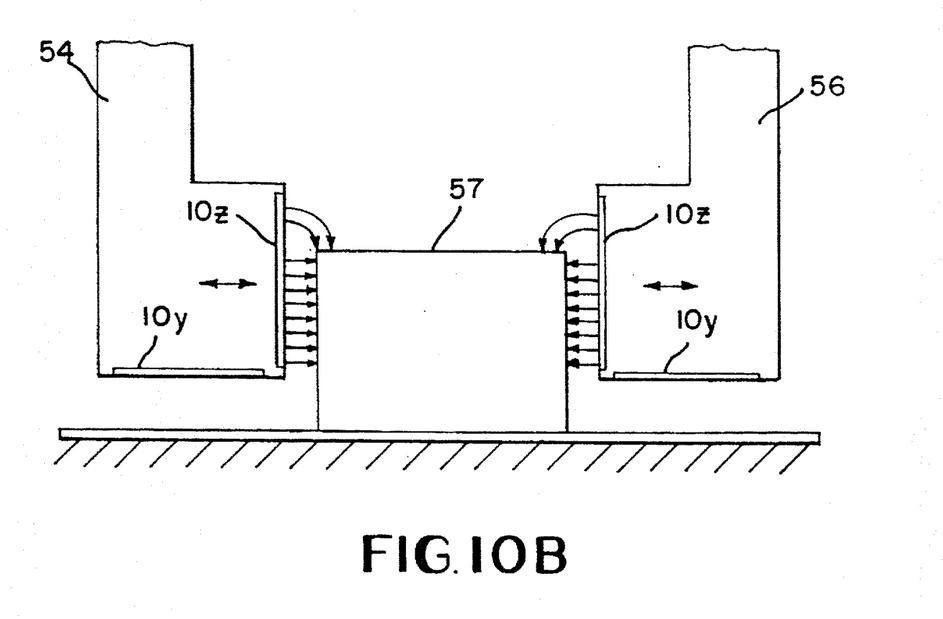
Figure 11:
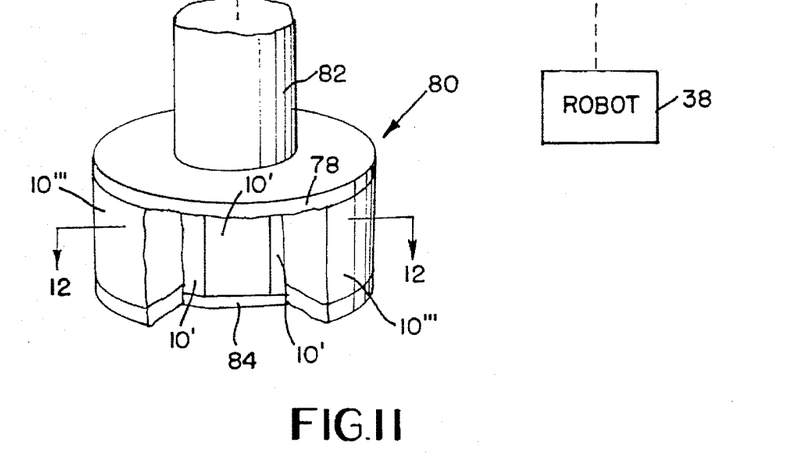
FIG. 11 is a perspective view partially cut away of a socket head for turning a hex head screw and including a capaciflector sensor array mounted thereon.
Figure 12:
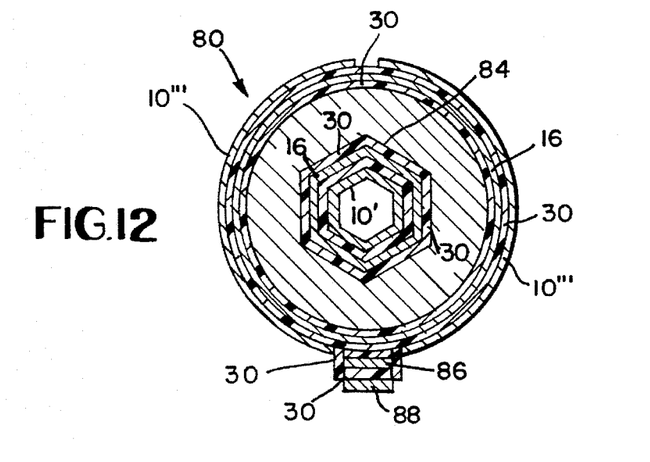
FIG. 12 is a transverse cross-sectional view of the socket head shown in FIG. 11 taken along the lines 12—12 thereof.
Figure 13:
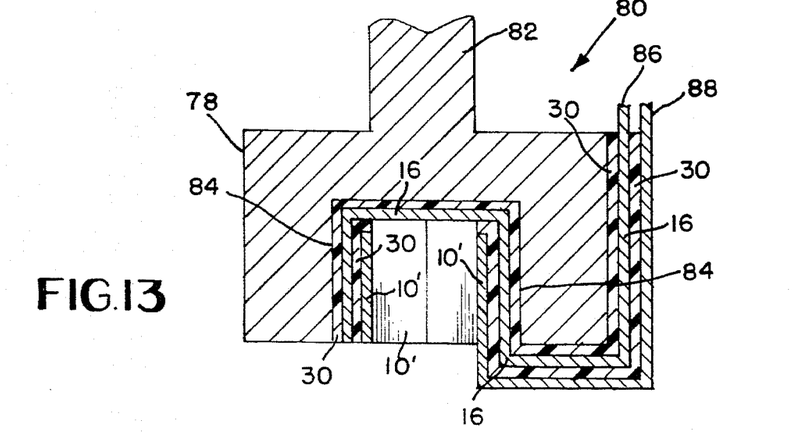
FIG. 13 is a central longitudinal cross-sectional view of the socket head shown in FIG. 11.

As shown in FIGS. 10A and 10B, the opposing members 54 and 56 are first brought into substantial alignment with an object 57 while directly referencing each other with no offsets and then lowered while being "wiggled" into a precision fit prior to contact. While single element sensors $10_z$ and $10_y$ are shown, overlaid sensor arrangements as shown in FIG. 3 can be utilized as needed.

This technique is analogous to end-point force/torque sensing except that the forces are virtual and the coefficient of friction is zero. It should be noted that it is not necessary to precisely calibrate and characterize the sensors $10_x$, $10_y$ and $10_z$ because they are self-calibrating.

Accordingly, such a configuration provides a means whereby the heretofore utilized large passive compliance system can be eliminated. A robot control system can now easily perform the role of passive compliance with no external assistance. Secondly, the residual forces that normally would be stored in the passive compliance system have been relieved. Thirdly, the bouncing and scraping of the mechanical guidance portion of the assembly using passive compliances has been replaced with a much smoother, non-contact technique of "virtual force".

Figure 14A:
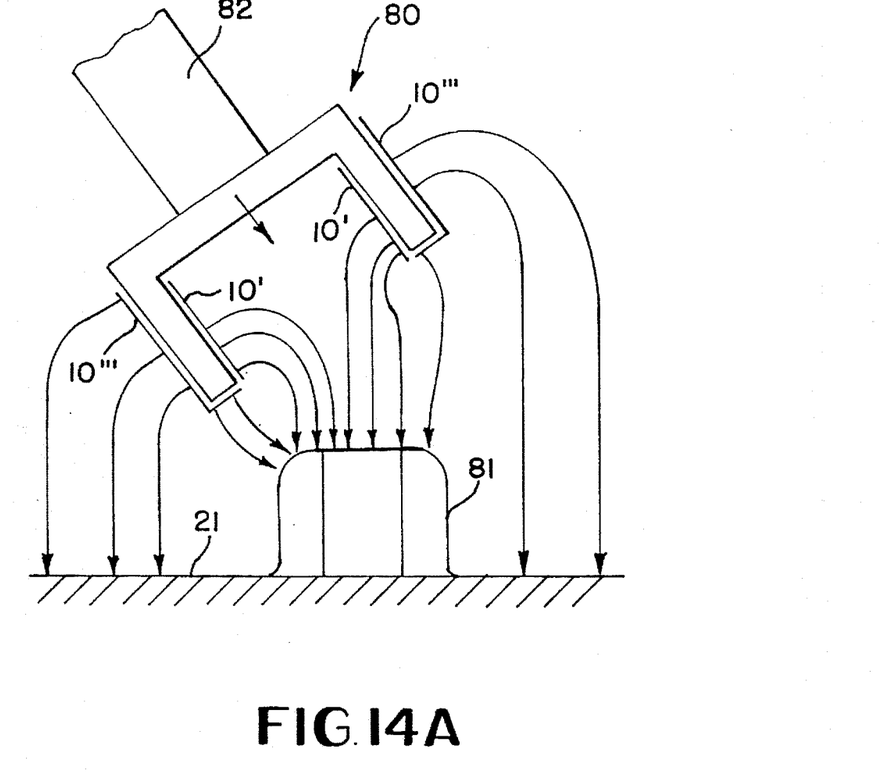
FIGS. 14A and 14B are illustrative of a socket head first approaching a hex head screw and then in position over the screw prior to engagement therewith.

Referring now to FIGS. 11–13 and 14A, 14B, a second example is intended to illustrate a capaciflector guided socket head 80 (FIG. 11) being robotically driven so as to engage a hex head screw 81 (FIG. 14A). This embodiment, as further shown in FIG. 11, includes a pair of relatively large, i.e. long, sensor elements 10''' having a coarse sensor capacitance characteristic such as shown by reference numeral 32 in FIG. 2 affixed to the outside surface 78 of the socket head 80. The shaft 82 of the socket head 80 is connected to and driven by the robot 38 (FIG. 6). The interior of the socket head 80 includes hexagonal screw contact surfaces 84 on which are mounted respective capaciflector sensor elements 10' behind which is located a common capaciflector shield member 16. Both elements are mutually separated by intervening layers of insulation 30. The thin metallic layers constituting the sensor elements 10' and the shield 16 also include mutually insulated lead members 86 and 88 as best shown in the cross-sectional view of FIG. 13.

Figure 14B:
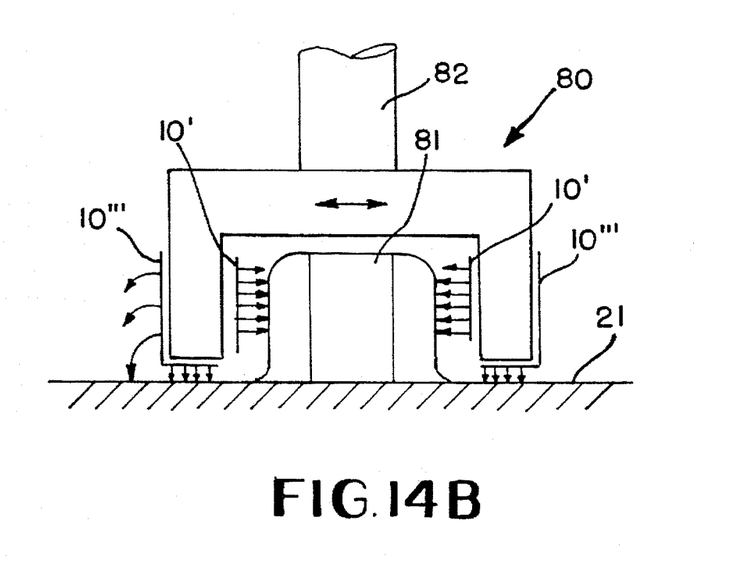

This tool embodiment is intended to illustrate the fact that the outer sensor elements 10''' are used to prevent undesired premature collisions of the socket head 80 with the hex head screw and/or ground plane 21. Once brought into position as shown in FIG. 14A, the inner fine sensor electrode elements 10' are utilized to provide a final alignment and contact with the hex head screw 82 as shown in FIG. 14B.

Figure 15A:
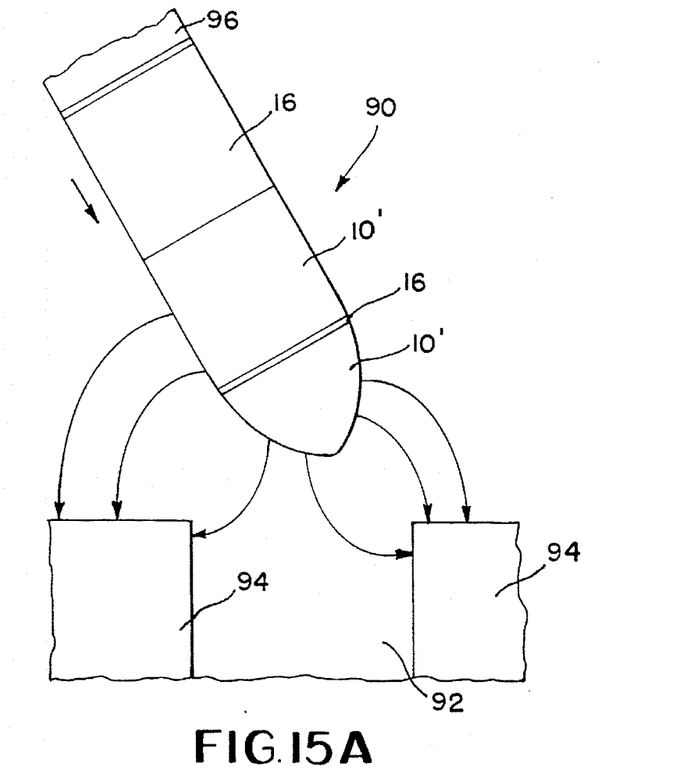
FIGS. 15A and 15B are illustrative of a guided pin including a set of capaciflectors, first being aligned with a destination hole and then being inserted therein.
Figure 15B:
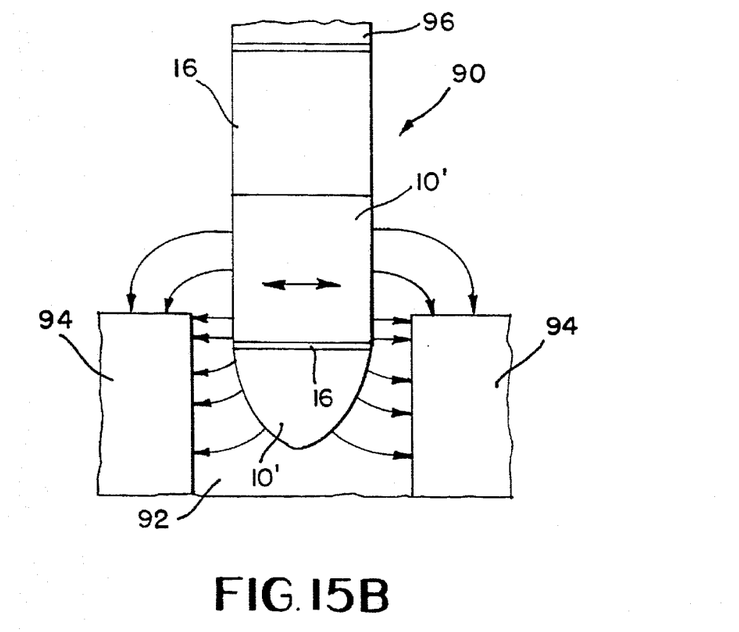

A third example illustrating the subject inventive concept is shown in FIGS. 15A and 15B where an alignment pin, for example as shown by reference numeral 90 under robotic control is positioned over and inserted in a recess or hole 92 including an inside wall surface 94. The alignment pin 90 as depicted is comprised of, for example, a grounded body member 96 with a shield layer 16 formed over its outer end with a first sensor element 10' located on the tip portion of the pin 90 and a second sensor 10' located just behind the sensor on the tip. As shown in FIG. 15A, when the pin 90 is brought into a vertical position, both sensors are used for positioning and alignment. In FIG. 15B, both sensors 10' operate to center the pin 90 over the hole 92 and precisely center the pin as it is moved downwardly into the hole.

Thus using capaciflector guided mechanisms as shown above, an electric field having a 1 ft. range can provide advance warning to the robot 38 whereupon it can completely eliminate the possibility of undesired collisions with objects or personnel so that a device can be moved to a close-in alignment with an object of, for example, 2 in. ±0.25 in., with a transverse error of less than 0.004 in. and an angular error of less than 1° and then execute a soft contact therewith. Furthermore, the robot 38 (FIG. 6) can move the sensor mounted device around the object and generate a 3-D model of the mating areas, e.g. the pins and their mating holes as the case may be.

Figure 16A:
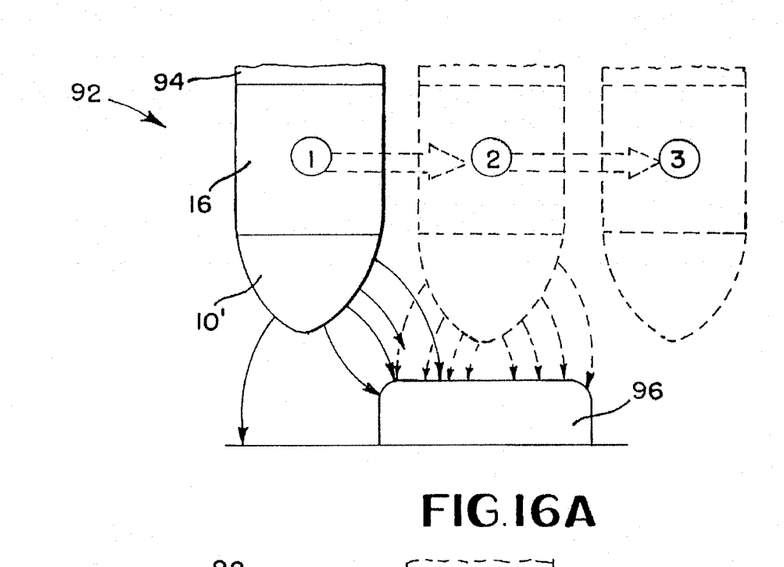
FIGS. 16A and 16B are diagrams illustrative of a variable capacitance imaging technique.
Figure 16B:
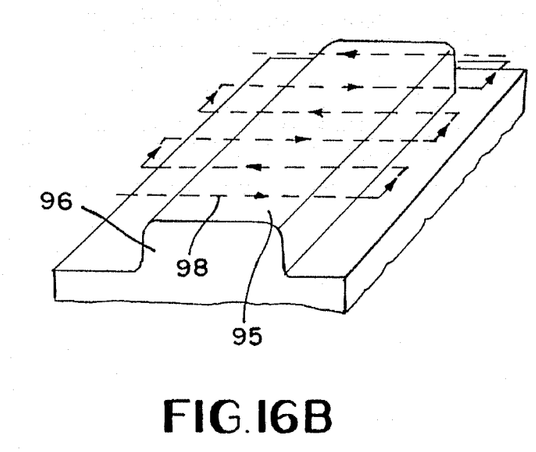

FIGS. 16A, 16B and 17A, 17B, moreover, depict two separate scanning methods whereby a scanning probe such as shown by reference numeral 92 can be used to generate a topographical map of an object's surface. The probe 92 is shown including a sensor 10' on the tip, a shield 16 thereunder which extends out from and along the body 94. FIGS. 16A and 16B disclose a variable capacitance imaging technique where the probe 92 is positioned at a constant height over the surface 95 of an object 96 and is moved rectilinearly over the top of the object first in one direction and then the other while incrementally advancing by discrete steps at the end of each scan line as shown by the scan line pattern 98.

Figure 17A:
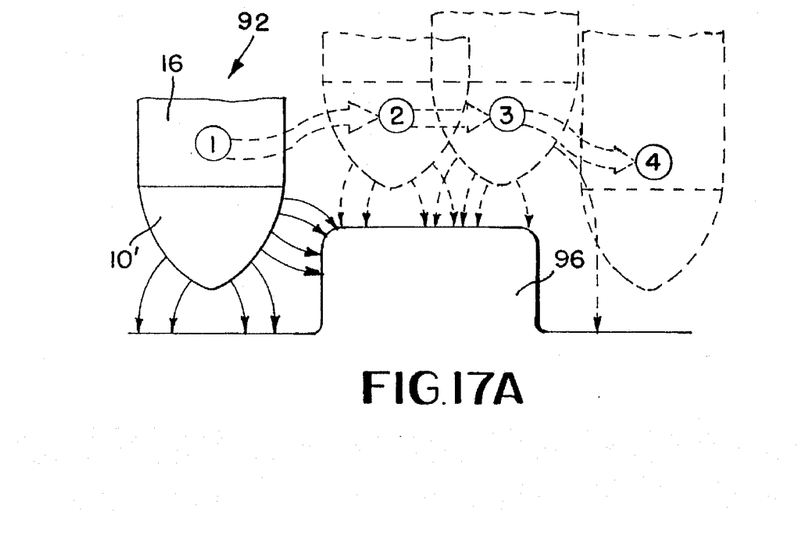
FIGS. 17A and 17B are diagrams illustrative of a constant capacitance imaging technique.
Figure 17B:
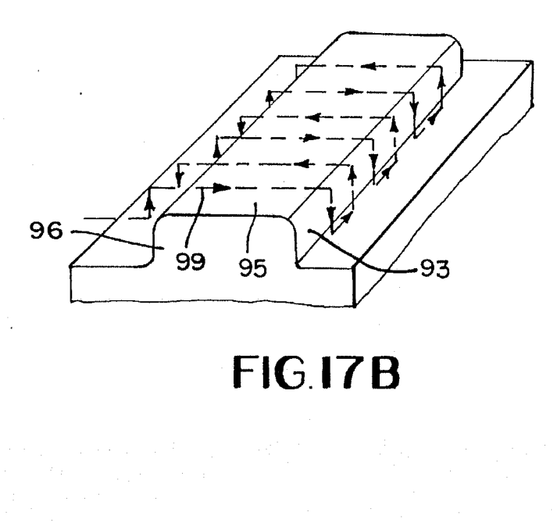

In FIGS. 17A and 17B, there is a variation of such a rectilinear scan where a constant capacitance imaging technique is effected and where the probe 92 moves up, down and over the side and top surfaces 93 and 95 of the object 96 while maintaining a constant separation therefrom as represented by the scan line pattern 99 shown in FIG. 17B. When desirable, a combination of the two methods can be employed.

An operator can thus clearly see mating members coming together in a 3-D graphical format when desired, complete with range and location information and with the entire operation being accomplished in complete safety without the potential for unwanted misalignments and collisions while at the same time providing a subsequent final alignment and soft touchdown. Also, one can do periodic calibrations to upgrade the fidelity of the image.

Figure 18:
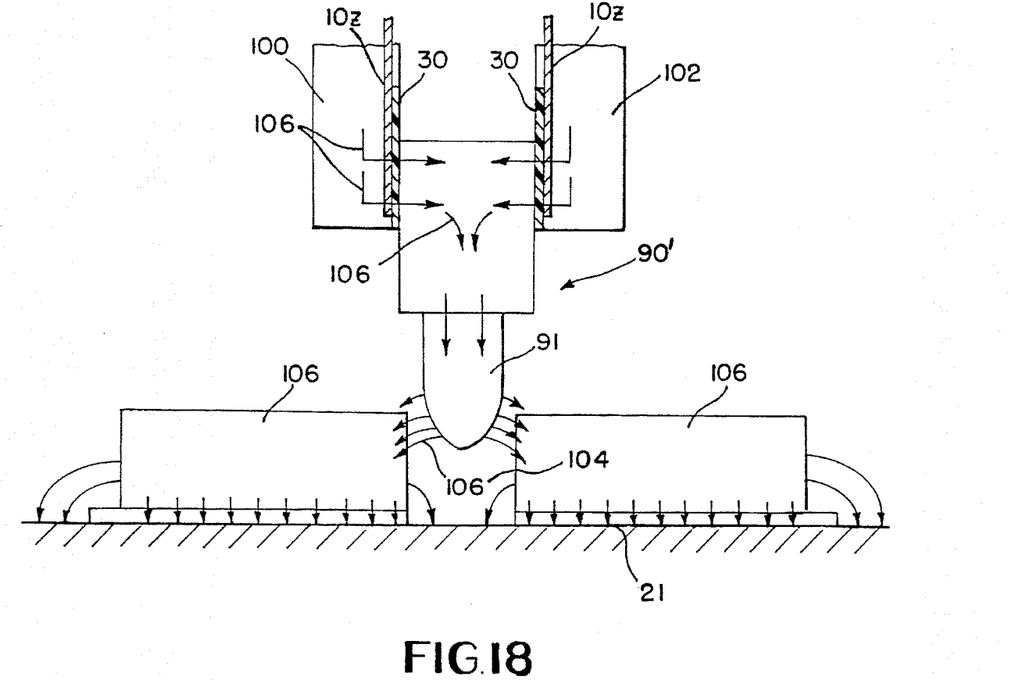
FIG. 18 is a diagram illustrative of capaciflector electric field transference from a gripper to a device being inserted into a hole of an object or fixture.

One additional feature of this invention comprises the concept of capaciflector transference of electrical flux from one component to another. In FIG. 18, for example, shown thereat is a gripper mechanism including a pair of opposing gripper arms 100 and 102 and having respective capaciflector sensor assemblies $10_z$ mounted on opposing side surfaces thereof which has gripped an object 90, e.g. an alignment pin having a metal tip 91. As illustrated, the top 91 is aligned with a hole 104 in a fixture 106. It can be seen that in the process of berthing the pin 91 into the hole 104, electrical flux lines as shown by reference numeral 106 travel from the gripper arms 100 and 102 through the body of the alignment pin 90' to the tip 91 where they enter the fixture 106 and the exit from the fixture 106 to the ground plane 21.

Figure 19:
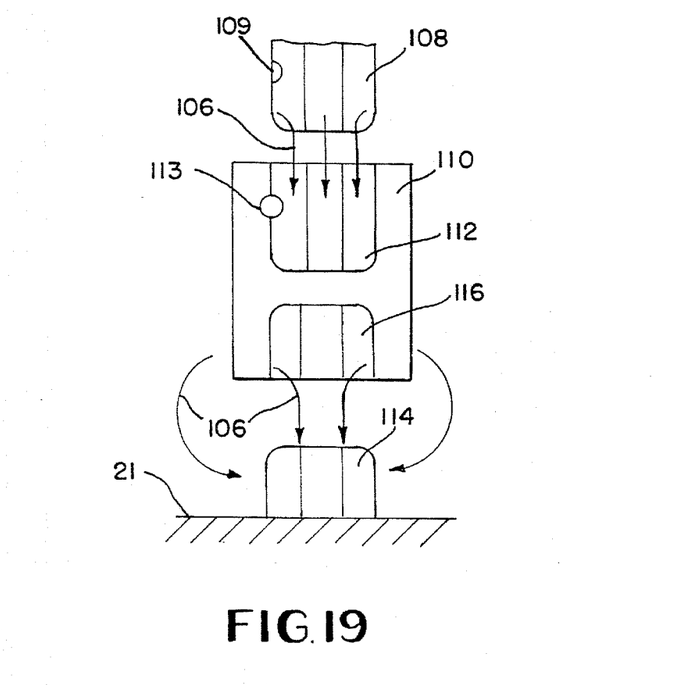
FIG. 19 is a diagram illustrative of capaciflector electric field transference from a tool driver to a socket head for a hex head screw.

A second example of flux transference is shown in FIG. 19 where, for example, a hex driver element 108 including a detent 109 is attached to a robot, not shown. The driver element 108 is adapted to be coupled to a tool bit interface 110 and includes a hex cavity 112 for receiving the driver 108 so that the detent 109 engages a ball detent 113. The tool bit interface 110 additionally includes a hex head socket 116 at the opposite end which is adapted to engage a hex head screw 114. It can be seen that electrical flux lines 106 will pass from the driver element 108 through the tool bit interface 110 to the hex head screw 114 as shown in FIG. 19.

Accordingly, the hardware necessary for implementing capaciflector-guided mechanisms and devices is relatively simple. The capaciflector sensing surfaces, moreover, can assume any size and shape desired, from a large area very thin, flexible and conformal film covered with paint and mounted on a robot arm or the bottom of an orbit or replacement unit to a solid structural and load-bearing part of a screw.

The capaciflector sensors are also very compatible with space as well as an earth orbit environment. The sensors, moreover, are virtually indestructible in low earth environment. Oxygen ions cannot destroy them and micrometerorite and space debris collisions cannot affect these devices. Also, gamma rays do not affect either plates or shields. The electronic circuitry is straightforward and can easily be shielded in the space and low earth orbit environment. Ions and electrons may charge bias the capacitive electrode (sensors and shield, even ground); however, the system is an AC system and these, essentially DC charges, can be treated as a simple voltage offset.

While the embodiments disclosed herein make reference to robotically delivered devices including sensory apparatus, it should be noted that, when desirable, the holes of receptacles themselves may comprise sensory active destination points. Thus elements of holes and receptacles can act as capaciflector guided mechanisms as well as the screws and fasteners therefor.

The subject invention provides several advantages over the known prior art, one of which is an improvement in the order of magnitude in the precision with which docking and berthing can be carried out. Also, the ability to perform vectored "virtual force" precontact operations permits one to perform maintenance and assembly without disturbing delicate scientific instruments. Furthermore, significant improvements in operational flexibility and versatility are provided, since many tasks and procedures will now become routine which heretofore have been impossible. For example, a robot with a capaciflector-guided end effector will be able to scan and search a region and image and identify the tool and its proper grasping points prior to grasping it. Moreover, this can be achieved without any lighting difficulties or obstructions of view.

Exceptional simplicity and robustness in the system is also achieved by this invention. This is not only in terms of its physical robustness and simplicity of its hardware, but also in its electronics software and computer requirements. Furthermore, the system is self calibrating against the conditions against which it operates at any given instance. Offsets between sensor mechanism contact points are eliminated by making them one and the same. The system simply is adapted to operate very close to contact, a region in which it is very accurate and sensitive and calculates relative signal nulls and maximums, thus providing guidance with great precision using very little apriori knowledge and computer power.

Still further, the present invention's ability to energize the object it is grasping so that this too becomes a capaciflector guided mechanism is also of great value. This capability is required when assembling one object to another using a robotic gripper or fastener. The gripper or fastener itself becomes a capaciflector-guided mechanism and so it can grasp an object with great precision and efficiency so that the sensor is merely extended from the gripper or fastener through the object.

Having thus shown and described what is at present considered to be the preferred embodiments of the invention, it should be noted that the same has been made by way of illustration and not limitation. Accordingly, all modifications, alterations and changes coming within the spirit and scope of the invention as set forth in the appended claims are herein meant to be included.

I claim:

1. A system for guiding a piece of apparatus into relationship with another piece of apparatus, comprising:

robotic means for guiding a device into position relative to an object;

means for controlling said robotic means;

a device attached to said robotic means and including at least one capaciflector type proximity sensor affixed thereto for sensing an object coming into relatively close proximity therewith;

said capaciflector type proximity sensor including, at least one outer electrical conductor on a surface of said device and forming one electrode of a sensor capacitor, the other electrode of said sensor capacitor comprising said object, an intermediate electrical conductor located between said at least one outer conductor and said surface and being of a size larger than said at least one outer conductor to act as a shield for reducing the parasitic capacitance between said outer conductor and said surface, said intermediate conductor and said outer conductor mutually overlaying each other, said at least one outer conductor and said intermediate conductor further being located on said surface with no air gap therebetween and no air gap between said intermediate conductor and said surface, and wherein said surface acts as a surface of reference potential or a ground plane;

an AC voltage source; and circuit means coupled between said AC voltage source and said at least one outer and intermediate conductors for coupling a same voltage from said voltage source to said outer electrical conductor and said intermediate electrical conductor, said circuit means being responsive to the change in capacitance of said sensor for generating an output signal, said output signal being coupled to said means for controlling said robotic means, and wherein said means for controlling generates control signals for controlling said robotic means to move said device in an operational mode whereby said robotic means guides said device to a predetermined location on said object and moves said device in a predetermined scan pattern over said location, whereby since electrical charge slides along the surface of a conductor the charge thereat induces an equal but opposite charge on an opposing member these charges collect at the point nearest each other, thereby referencing each other without any offset, and by a process of signal minimization of said output signals which are generated in response to a capacitance verses distance characteristic of said sensor, said device is moved in ever decreasing translational increments by said robotic means into position for making contact with said object without any prior undesired contact or collision therewith.

2. A system according to claim 1 wherein said at least one outer conductor and said intermediate conductor are comprised of relatively thin strips of conductor material.

3. A system according to claim 1 wherein said at least one outer conductor comprises at least two overlaid and mutually insulated outer conductors of different sizes.

4. A system according to claim 3 wherein said at least two outer conductors and said intermediate conductors are comprised of relatively thin strips of conductive material.

5. A system according to claim 1 wherein said at least one outer conductor comprises a plurality of outer conductors, each being located on a mutually different surface of said device.

6. A system according to claim 5 wherein said plurality of outer conductors comprises at least two outer conductors respectively located on two separate mutually orthogonal surfaces of said device.

7. A system according to claim 5 wherein said plurality of outer conductors comprises at least three outer conductors respectively located on three mutually intersecting surfaces of said device.

8. A system according to claim 1 wherein said circuit means includes means for sensing a current in said at least one outer conductor.

9. A system according to claim 8 wherein said means for sensing current comprises a current-measuring voltage follower circuit means.

10. A system according to claim 9 wherein said current-measuring voltage follower circuit means includes a current sensing resistor and wherein the voltage across said resistor comprises said output voltage.

11. A system according to claim 1 wherein said circuit means comprises respective current sensing voltage follower circuit coupled between said AC voltage source and at least one outer conductor and said intermediate conductor.

12. A system according to claim 1 wherein said device comprises a gripper mechanism.

13. A system according to claim 12 wherein said gripper mechanism includes a pair of opposing gripper members having a plurality of capaciflector type proximity sensors mounted thereon for sensing said object in three dimensions for generating a 3-D image.

14. A system according to claim 1 wherein said device comprises a tool for engaging said object, said object comprising a piece of hardware.

15. A system according to claim 14 wherein said tool comprises a screw driving tool having a plurality of capaciflector type proximity sensors mounted thereon for sensing said piece of hardware and any surfaces and objects in relatively close proximity thereto.

16. A system according to claim 1 wherein said device comprises an alignment pin having at least one capaciflector type proximity sensor mounted thereon for sensing and mating with a hole in said object.

* * * * *